Nov. 13, 1962 C. D. RHOTEN 3,063,619

RECORD ALBUM

Filed Nov. 22, 1960

*INVENTOR.*

CAREY D. RHOTEN

*BY* Kenway, Jenney & Hildreth

ATTORNEYS

United States Patent Office 3,063,619
Patented Nov. 13, 1962

3,063,619
RECORD ALBUM
Carey D. Rhoten, Oak Park, Ill.
(40 Commercial St., Fitchburg, Mass.)
Filed Nov. 22, 1960, Ser. No. 71,076
1 Claim. (Cl. 229—68)

This invention relates in general to albums for phonograph records and more particularly comprises a new and improved dust-proof, self-sealing record album.

Modern phonograph records and particularly those used in high fidelity and stereophonic equipment are made from a tough, durable plastic material which, for all practical purposes, gives the record a non-breakable quality. While a record may possess the very desirable characteristic of structural durability, it is nevertheless highly sensitive to damage by dust. Grooves of a standard 78 r.p.m. record measure .003 inch in width while the standard micro-groove records of 33⅓ and 45 r.p.m. have grooves that measure only .001 inch in width. These grooves are extremely delicate and unless proper consideration is given to maintaining the record in a meticulously clean condition, the abrasive action between the needle and dust particles lodged in the grooves will soon permanently impair the sound reproducing ability of the record. To make matters even more difficult, the records themselves quite easily become charged with static electricity and attract whatever dust or lint particles may be in the immediate vicinity.

It has been estimated by leading record manufacturers that the presence of minute, gritty dust particles on a record will increase the wear on both the record and the needle ten times faster than if the record were kept in a clean condition.

Recognizing the fact that records can be seriously damaged by minute particles or dust, various measures have been taken to free the record of any dust before it is played. For instance, brushes and even small vacuum cleaners have been mounted in the record player to precede the needle for the purpose of cleaning the grooves of abrasive material. Other techniques have also been advanced in an attempt to free the record of lint and dust.

Despite all of the precautions taken to clean phonograph records very little consideration has been given to prevent dust from collecting on the records while they are in storage. A conventional record album essentially is nothing more than a cardboard sleeve or envelope open along one edge. Whenever a record is inserted or removed from its album, the sides are usually flexed apart so that the record can be grasped. After several such flexings, the sides of the album frequently split away from one another or the album may assume a rather permanent deformation with the album opening somewhat outwardly flared so that dust and lint may enter quite freely.

It is an object of the present invention to provide a novel record album which will be at the same time both dust-proof and self-sealing.

Another object of this invention is to provide a record album that is both durable and formed with a sufficiently wide opening that the record contained therein may be easily grasped without undue deformation of the album.

Yet another object of this invention is to improve the life of phonograph records by providing a storage album which will prevent the collection of dust on a record contained therein.

More particularly, this invention features a record album in which two panels of corresponding size are joined along portions of their marginal edges with one edge being open to provide access to the contents of the album. Along the opposite marginal edges of the opening there are provided flexible, magnetically attractive strips which extend the entire width of the opening and normally hold the album in a tightly sealed condition.

As another feature of this invention, the album is provided along the edges adjacent the opening with expansible accordion pleats which permit the panels to be separated to such an extent that the record may be easily grasped without damage to the album.

These and other features of the invention along with further objects and advantages thereof will become apparent upon a detailed description of a preferred embodiment of the invention taken in connection with the accompanying drawings in which.

Figure 1:
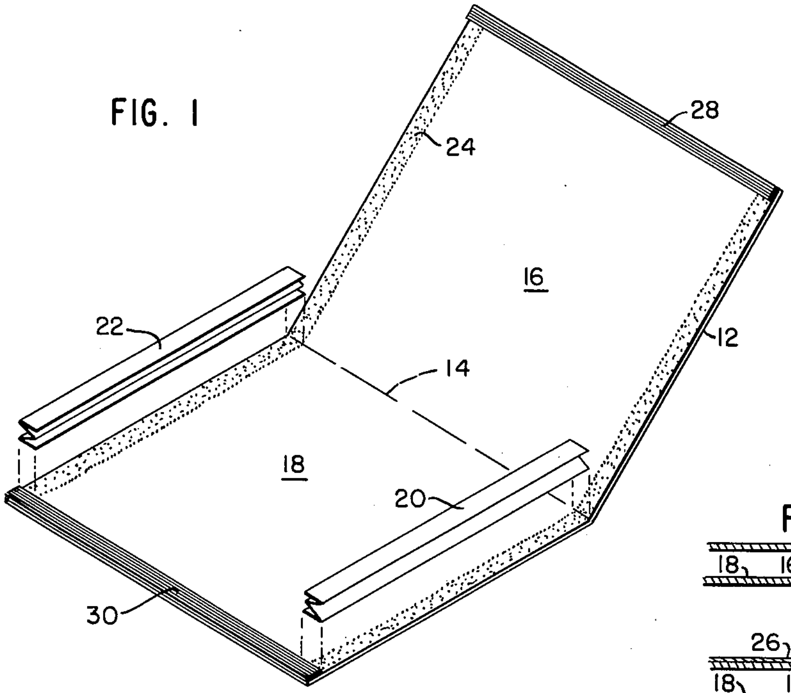
FIG. 1 is an exploded view of a record album made according to the invention.

Referring now to the drawings, the reference character 10 generally indicates a record album or envelope fabricated from a rectangular sheet 12 of relatively stiff cardboard or similar material. The sheet 12 is folded transversely across a center fold line 14 to form a pair of panels 16 and 18 of generally the same size and shape. The panels are folded back upon themselves and joined in superposed relation by a pair of expansible, accordion pleated inserts 20 and 22. The pleats 20 and 22 may be of any suitable material such as paper, cloth or nylon, for instance, and are secured to the panel edges adjacent the fold line 14.

Figure 4:
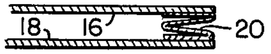
FIG. 4 is a cross-sectional view taken along the line 4—4 of FIG. 2.
Figure 5:
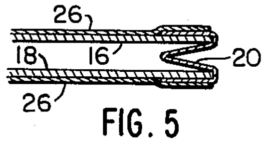
FIG. 5 is a view similar to FIG. 4 but showing a modification of the pleat connection.

A narrow coating of adhesive 24 is applied along the marginal inner facing of the panels and bond the outermost folds of the pleated inserts to the panels as shown in FIG. 4. A somewhat more durable connection between the inserts and the panels may be obtained by securing the outermost folds of the inserts to the outer marginal surfaces of the panels as shown in FIG. 5. A conventional illustrated glossy sheet 26 may be bonded over the entire outer surface of the panels, including that portion of the inserts secured to the panel edges, to present a neat finished appearance.

Figure 2:
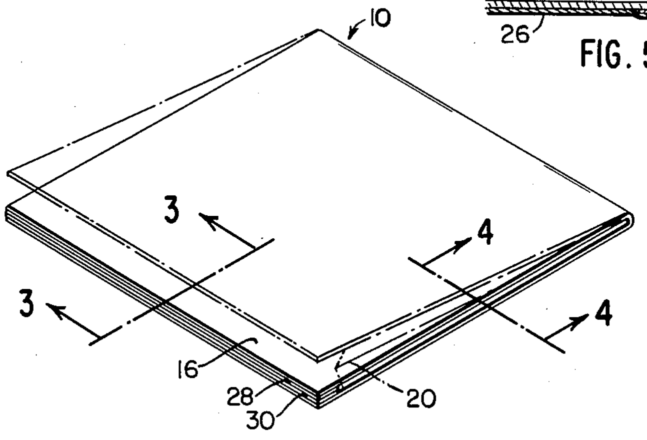
FIG. 2 is a view in perspective showing the album in a closed position with broken lines showing the album in an open position.
Figure 3:
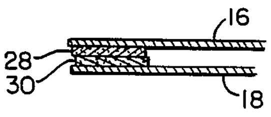
FIG. 3 is a cross-sectional view taken along the line 3—3 of FIG. 2.

At the open end of the album there are mounted strips or bands 28 and 30 of flexible magnetic material such as Koroseal Magnetic Strip produced by The B. F. Goodrich Company. These strips are firmly secured in opposed relation along the marginal edges of the album opening and function to keep the opening in a normally closed position such as shown in FIGS. 2 and 3. The strips extend the full width of the opening and preferably butt against the outer ends of the inserts 20 and 22 so as to prevent any dust particles or the like from gaining entrance to the interior of the album.

The album may be opened by pulling the two panels apart from one another with sufficient pressure to overcome the magnetic attraction between the strips 28 and 30. The pleated inserts permit the apnels to be separated to such an extent that the record contained in the album may be easily grasped without deforming the panels to any great extent. It will be appreciated that once the record is removed or replaced, the magnetic strips being positioned in permanent face to face relation and restrained by the construction of the album from being spread apart beyond the limit of mutual attraction provided by the magnetic field therebetween, will bring the panel edges together, automatically sealing the album. This will take place even though the panels may have been deformed by handling. The flexible strips themselves may be easily deformed if necessary without damage and will readily resume their original condition when released to keep a tight seal for the album despite repeated bending or flexing.

While the invention has been described with particular reference to a preferred embodiment thereof, it will be understood that many modifications may be made without departing from the spirit of the invention. For instance, a compound album could be assembled in which several records are stored with several compartments provided, each closable by a flexible magnetic strip. Although the album has been shown with the strips extending the entire width of the opening, shorter strips may also be used to advantage. However the full width strips illustrated provide an effective dust seal and more efficient closure. Although it may be desirable to form the strips as L-shaped extrusions adapted to interlock one with another to make an even more effective seal.

Having thus described my invention, what I claim and desire to obtain by Letters Patent of the United States is:

A dust-proof, self-sealing record album, comprising a pair of normally flat and slightly resilient panels of corresponding size and shape, said panels being superposed one on the other and joined together continuously at their margins along and throughout one end and two opposite sides thereof to form an envelope type album of a size adapted to accommodate a disc type phonograph record, the remaining margins of the panels at the opposite end thereof being non-joined together and of a length to receive a record therebetween, two bands of magnetic material affixed in permanently opposed face to face relation on the inner faces of the opposed marginal edges of the panels at said non-joined end of the album, and expansible means connecting the panels at the ends of said bands and permitting separation thereof at said non-joined end of the album sufficiently to pass a record therethrough into and from the album but limiting such separation to a gap of a width always maintaining said bands within the mgnetic field therebetween whereby they normally close and remain closed in face to face contact by magnetic attraction.

References Cited in the file of this patent

UNITED STATES PATENTS

| | | |
|---|---|---|
| 1,455,419 | Ahlquist | May 15, 1923 |
| 2,448,611 | Martin | Sept. 7, 1948 |
| 2,784,757 | Bosca et al. | Mar. 12, 1957 |
| 2,797,370 | Bennett | June 25, 1957 |
| 2,807,359 | McKiernan | Sept. 24, 1957 |
| 2,959,832 | Baermann | Nov. 15, 1960 |